United States Patent
Gretz et al.

(10) Patent No.: US 9,640,964 B1
(45) Date of Patent: *May 2, 2017

(54) TWO-PIECE DUPLEX CONNECTOR WITH INTERNAL CABLE RETAINING RING

(71) Applicant: Arlington Industries, Inc., Scranton, PA (US)

(72) Inventors: Thomas J. Gretz, Port St. Lucie, FL (US); Daniel O'Neil, Moscow, PA (US)

(73) Assignee: Arlington Industries, Inc., Scranton, PA (US)

(*) Notice: Subject to any disclaimer, the term of this patent is extended or adjusted under 35 U.S.C. 154(b) by 233 days.

This patent is subject to a terminal disclaimer.

(21) Appl. No.: 14/726,485

(22) Filed: May 30, 2015

Related U.S. Application Data

(60) Provisional application No. 62/006,061, filed on May 31, 2014.

(51) Int. Cl.
  *H02G 3/18* (2006.01)
  *H02G 15/06* (2006.01)
  *H02G 1/14* (2006.01)

(52) U.S. Cl.
  CPC ............... *H02G 15/06* (2013.01); *H02G 1/14* (2013.01)

(58) Field of Classification Search
  CPC combination set(s) only.
  See application file for complete search history.

(56) References Cited

U.S. PATENT DOCUMENTS 6,995,316 B1 * 2/2006 Goto .................... H02G 15/013 16/2.1

* cited by examiner

*Primary Examiner* — Dhirubhai R Patel

(57) ABSTRACT

A duplex electrical connector constructed of two body portions with internal bores. The body portions easily assemble and disassemble in a sliding manner, the direction of the assembly and disassembly being substantially at right angles to the axes of the internal bores. A front connector body includes a leading end and a trailing end with a lip, a trailing flange, and a bottom periphery. A tab with an aperture therein extends from the top lip. A rear connector body includes a leading end with a front extension, a boss, a trailing end, and two internal bores extending from the trailing end to the leading end. Sliding assembly of the connector bodies enables minimizing the size of the connector bodies for reducing unit production costs while enabling easy disassembly of the two connector body portions for inspection of internal cable connections.

19 Claims, 10 Drawing Sheets

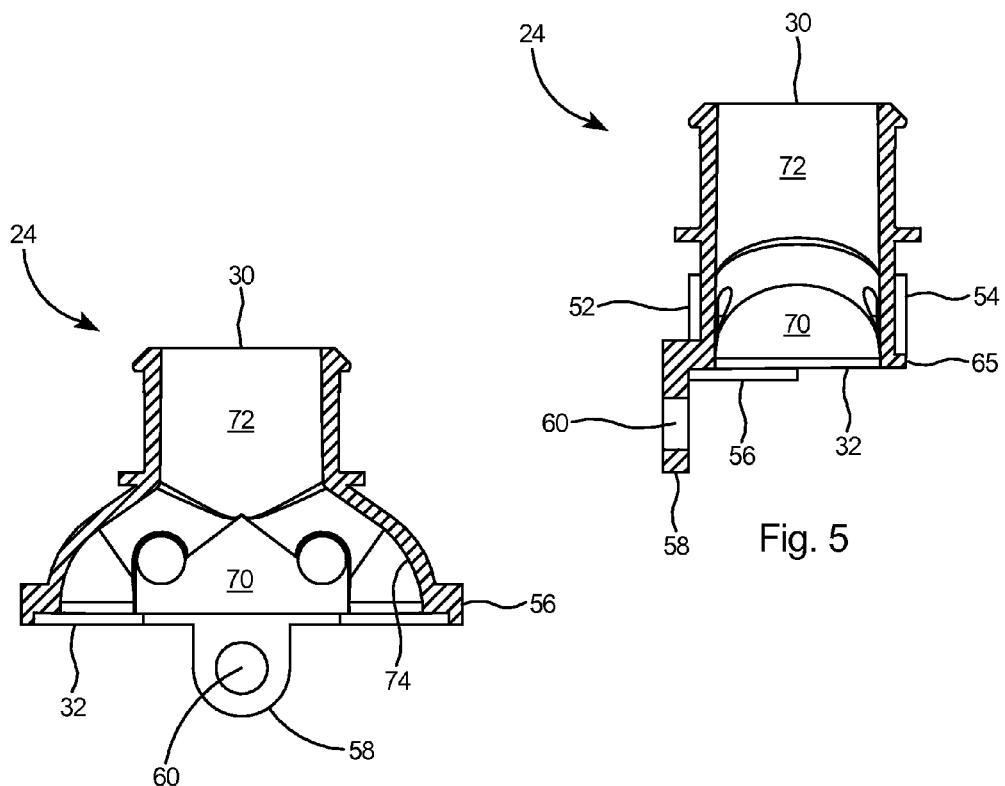
Fig. 5
Fig. 6
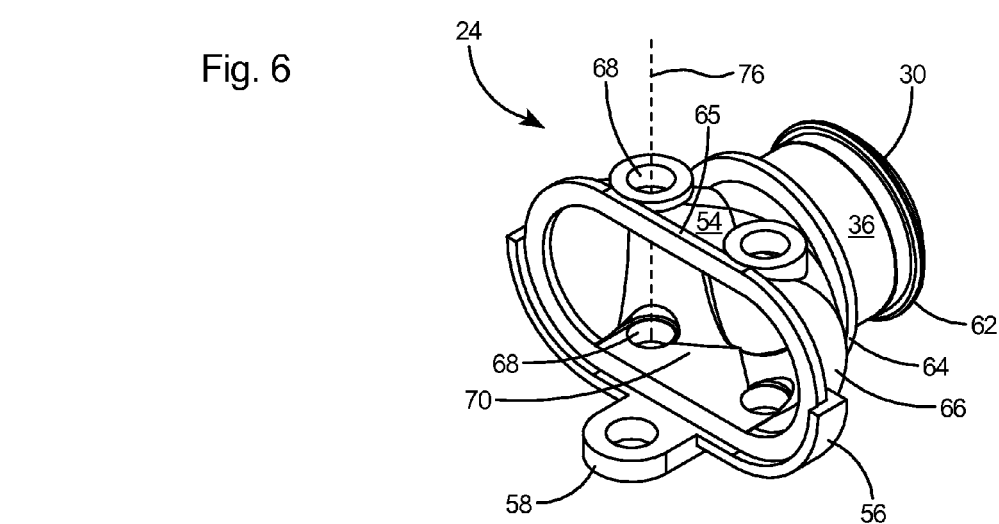
Fig. 7

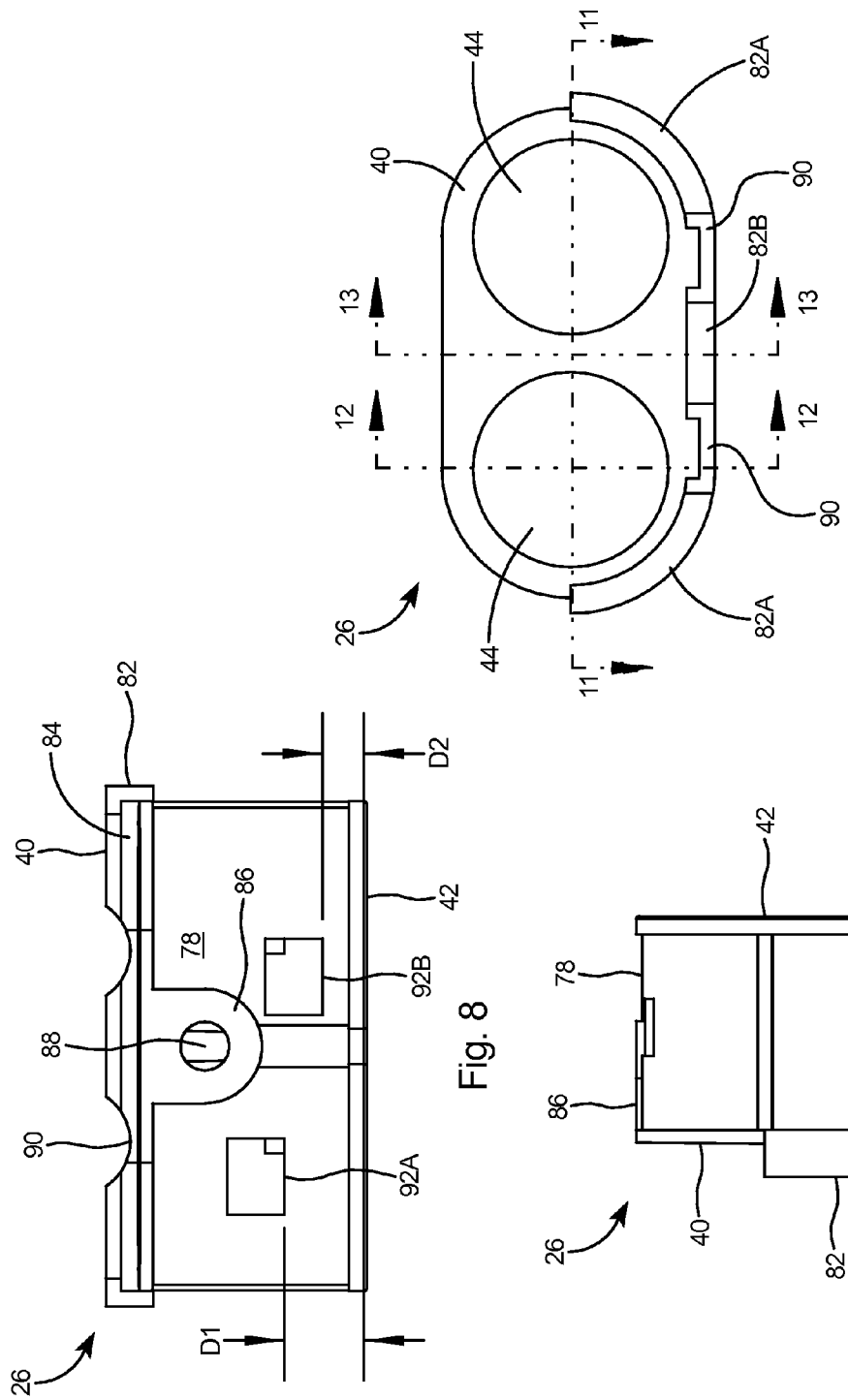

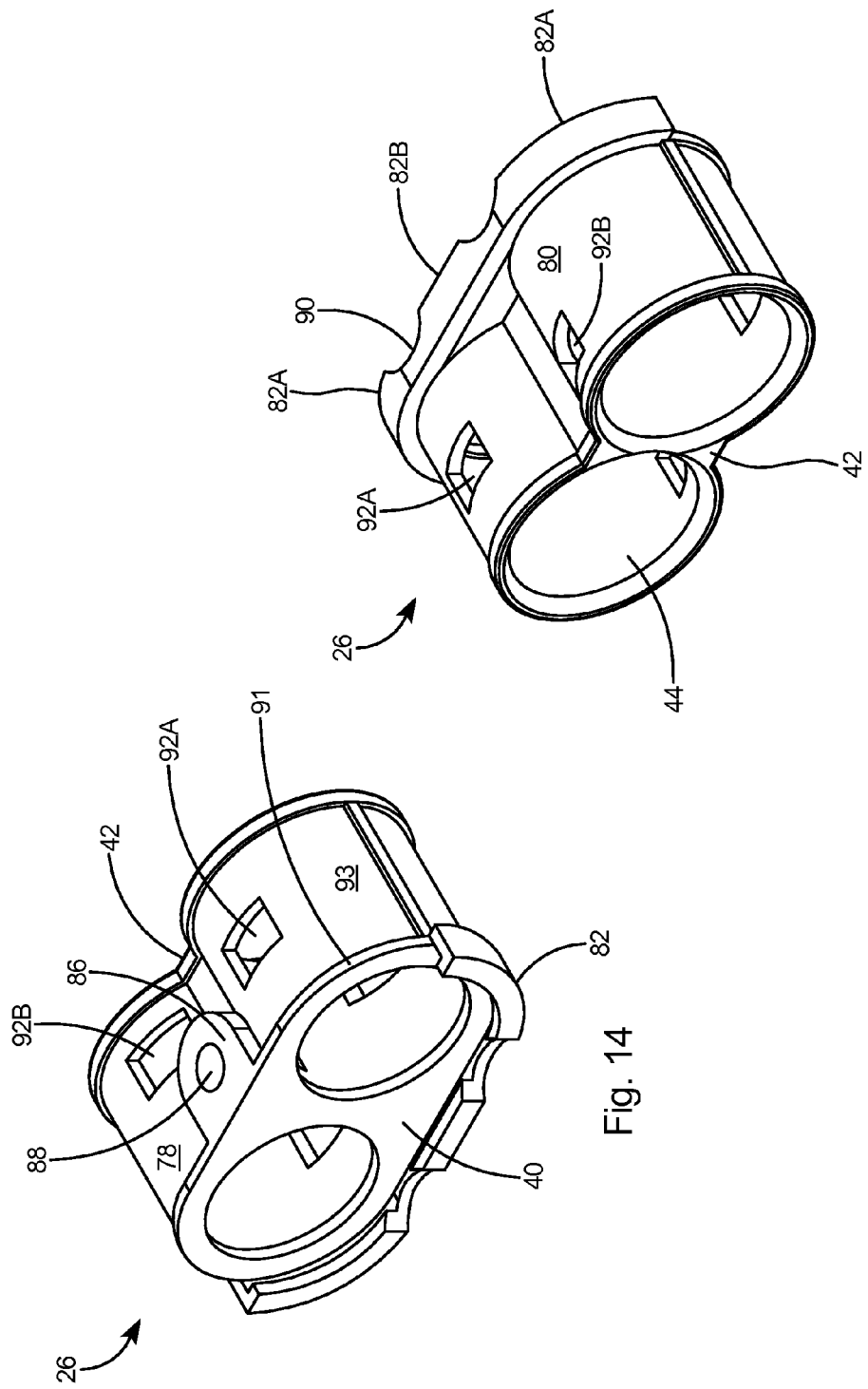

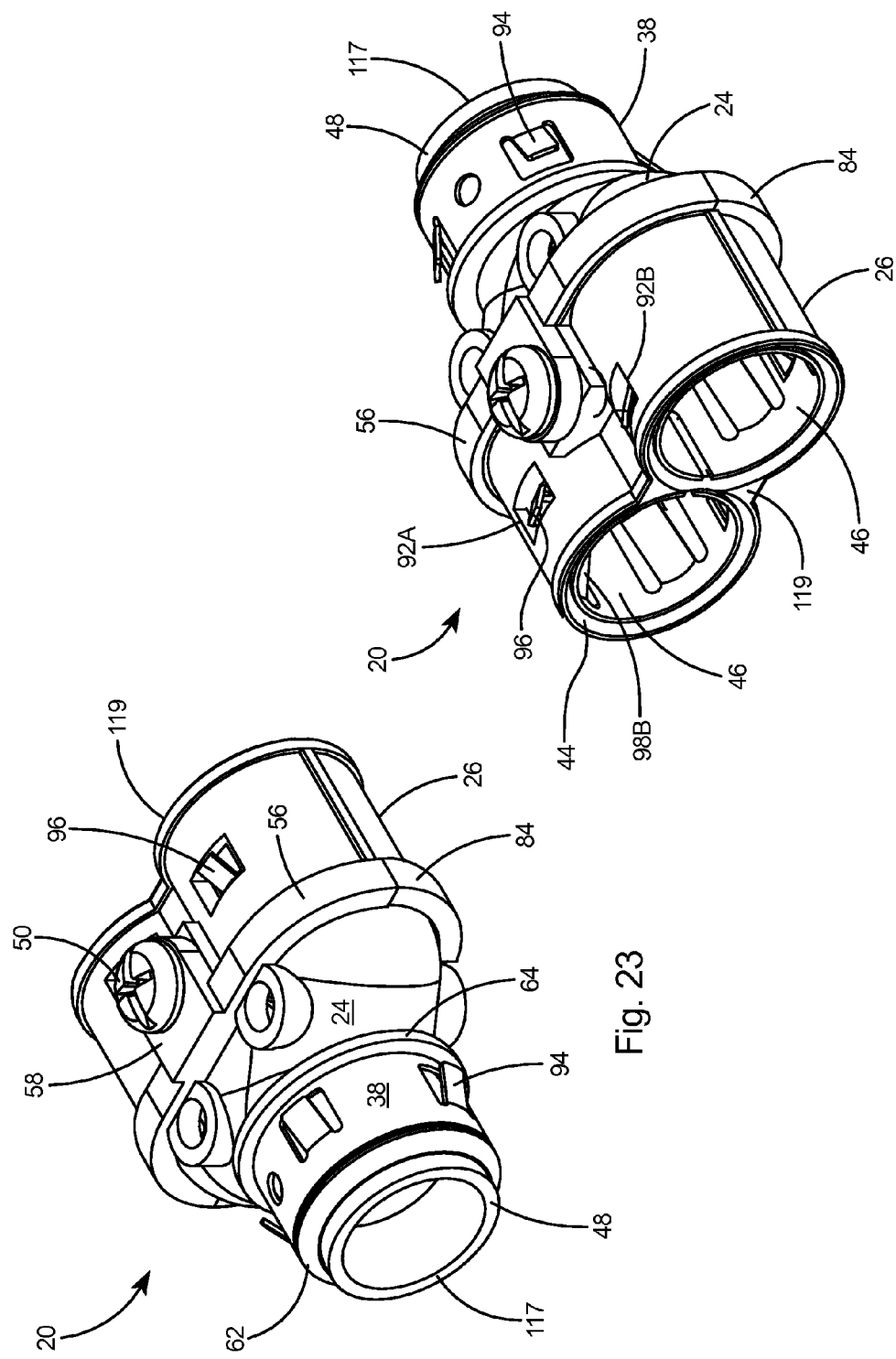

TWO-PIECE DUPLEX CONNECTOR WITH INTERNAL CABLE RETAINING RING

This application claims the priority of Provisional U.S. Patent Application Ser. No. 62/006,061 filed May 31, 2014.

FIELD OF THE INVENTION

This invention relates to electrical fittings or connectors for connecting electrical cables to a panel and specifically to a duplex electrical fitting or connector having a two-piece connector body in which the body pieces can be easily disconnected and slid apart for inspection or reconnection of an electrical cable to the trailing end of the fitting.

BACKGROUND

Duplex quick-connect electrical fittings are commonly used to rapidly connect two electrical cables to a single knockout aperture in an electrical box or electrical panel. Duplex quick-connect electrical fittings typically include a two-piece connector body having a trailing body portion with two bores therein for insertion of electrical cables and a leading body portion with a single bore therein for insertion into a knockout aperture of the electrical panel.

In a typical two-piece duplex quick-connect electrical fitting, the leading body portion includes an opening that accepts the trailing body portion and the two pieces are pressed together and connected by a screw or similar fastener. The two body portions are typically axially aligned and connected end-to-end, with the trailing body portion pressed within the opening of the leading body portion. Constructing a duplex fitting with axially aligned and joined end-to-end body portions typically adds substantial width and length to the resultant fitting as the leading body portion must be made large enough to accept the entire trailing body portion.

The amount of metallic alloy material used to construct the connector body portions directly affects the cost of the resultant fitting. It is therefore advantageous for manufacturers to minimize the size of the body portions to reduce unit production costs. Furthermore, there are times when an installer must disassemble the duplex fitting after it has been initially connected to a box or panel, such as for inspection or removal of the inserted electrical cables. In a conventional two-piece duplex fitting, it is difficult to separate the two body portions in order to inspect or remove the connected electrical cables.

Accordingly, what is needed is a duplex electrical fitting that lowers unit production costs. Furthermore, the duplex electrical fitting must be capable of being easily disassembled after connection to an electrical box to allow inspection of the inserted electrical cables.

BRIEF SUMMARY OF THE INVENTION

The current invention is a duplex electrical connector including a front connector body slidably connected to a rear connector body. The front connector body includes a leading end, a trailing end with a bottom periphery, a top side, a nose portion at the leading end, and a leading bore therein. The rear connector body includes a leading end, a trailing end, and two internal bores extending from the trailing end to the leading end. A lip extends along the top side of the trailing end of the front connector body. A tab with an aperture therein extends from the top lip. A front extension extends from the leading end of the rear connector body. A trailing flange extends along the bottom periphery of the trailing end of the front connector body. Rear connector body includes a boss having an aperture therein, with the axis of the bore at substantially a right angle with respect to the axes through the internal bores through the rear connector body. Front connector body is assembled to rear connector body by sliding the trailing flange of front connector body into open channel of front extension of rear connector body and affixing a screw through tab of front connector body into the boss of rear connector body. Such sliding assembly of the connector bodies enables minimizing the size of the connector bodies while enabling easy disassembly of the two connector body portions for inspection of internal cable connections. Nose portion of front connector body includes a seat and a snap ring disposed on the seat to facilitate connection of the duplex electrical connector to an electrical box or panel. A cable retaining ring secured in each internal bore in the rear connector body enables rapid and easy snap in connection of metal clad or armor clad cable to the trailing end of the duplex electrical connector.

OBJECTS AND ADVANTAGES

A first object of the current invention is to provide a duplex electrical fitting that enables easy snap-in insertion of an electrical cable into an electrical box, including easy snap-in insertion of an electrical cable at the trailing end of the fitting and easy snap-in insertion of the leading end of the fitting into the knockout of the electrical box.

A second object of the invention is to enable a reduction in size to realize a reduction in the unit production costs of duplex electrical fittings.

A further object of the invention is to provide a duplex electrical fitting including a two-piece connector body that may be easily disassembled for inspection of electrical cable connections.

A further object of the invention is to provide a two-piece duplex electrical fitting in which the pieces assemble and disassemble in a sliding manner, the direction of the assembly and disassembly being at substantially right angles to the axes of bores extending through the two-piece fitting.

BRIEF DESCRIPTION OF THE DRAWINGS

FIG. 5 is a sectional view of the front connector body taken along line 5-5 of FIG. 3.

FIG. 6 is a sectional view of the front connector body taken along line 6-6 of FIG. 4.

FIG. 7 is a bottom perspective view of the front connector body

FIG. 8 is a top view of a rear connector body that forms a portion of the duplex electrical connector shown in FIG. 1.

FIG. 9 is a side view of the rear connector body as viewed from the right side of FIG. 8.

FIG. 10 is an end view of the rear connector body as viewed from the bottom of FIG. 8.

FIG. 14 is a top perspective view of the rear connector body.

FIG. 15 is a bottom perspective view of the rear connector body.

FIG. 23 is a top isometric view of the duplex electrical connector assembly as viewed from the leading end.

FIG. 24 is a top isometric view of the duplex electrical connector assembly as viewed from the trailing end.

DETAILED DESCRIPTION

Figure 1:
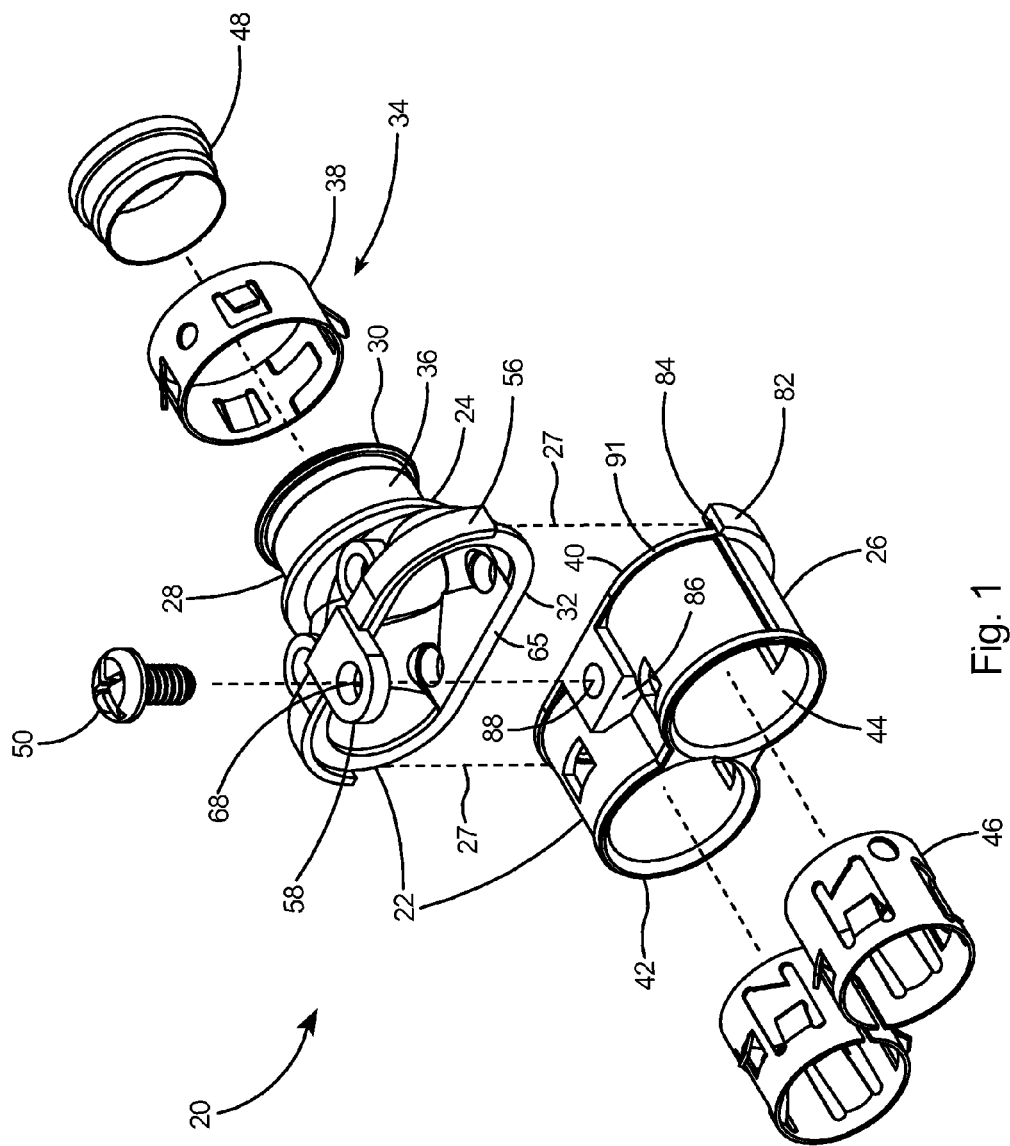
FIG. 1 is an exploded perspective view of the preferred embodiment of a duplex electrical connector according to the present invention.

With reference to FIG. 1 there is shown a preferred embodiment of the present invention, a duplex electrical connector 20 that is an assembly of a two-piece die cast connector body 22 including a front connector body 24 and a rear connector body 26. The front connector body 24 and rear connector body 26 are slideably connectable to one another along lines 27 as shown in FIG. 1. The front connector body 24 includes a nose portion 28 and a leading end 30 and a trailing end 32. A fastening arrangement 34 is included on the leading end of the front connector body 22 for fastening the duplex electrical connector 20 to an electrical panel or junction box (not shown). The fastening arrangement 34 includes a seat 36 on the nose portion 28 and a snap ring 38 that is shown exploded away from the leading end 30 of the front connector body 24. The rear connector body 26 includes a leading end 40, a trailing end 42 with two bores 44 therein, and a cable retaining ring 46 inserted in each trailing bore 44. A throat insert 48 is inserted the nose portion 28 of the front connector body 26 and a fastener 50 secures the front connector body 24 and rear connector body 26 together.

Figure 2:
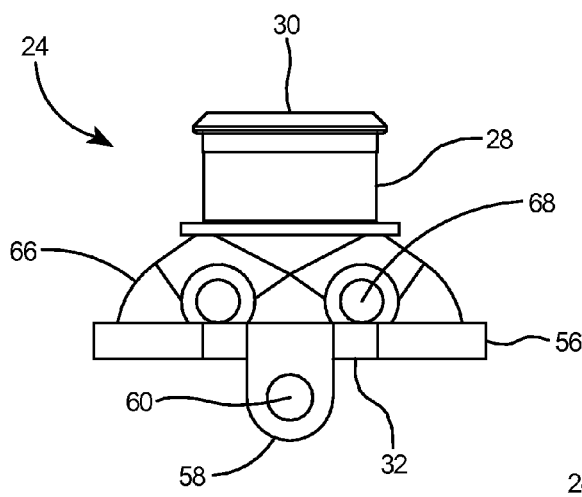
FIG. 2 is a top view of a front connector body that forms a portion of the duplex electrical connector shown in FIG. 1.
Figure 3:
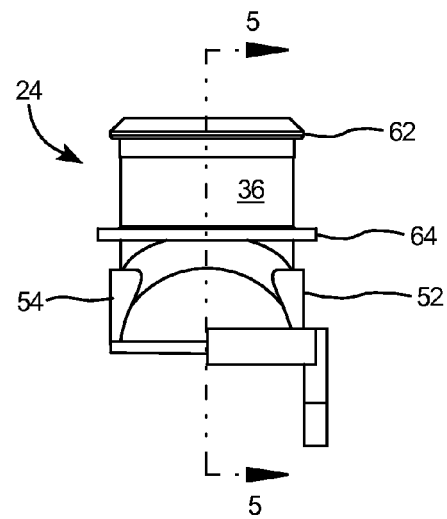
FIG. 3 is a side view of the front connector body.
Figure 4:
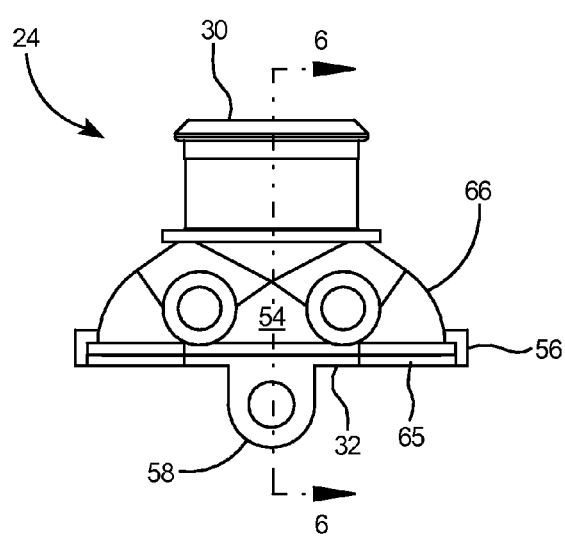
FIG. 4 is a bottom view of the front connector body.
Figure 11:
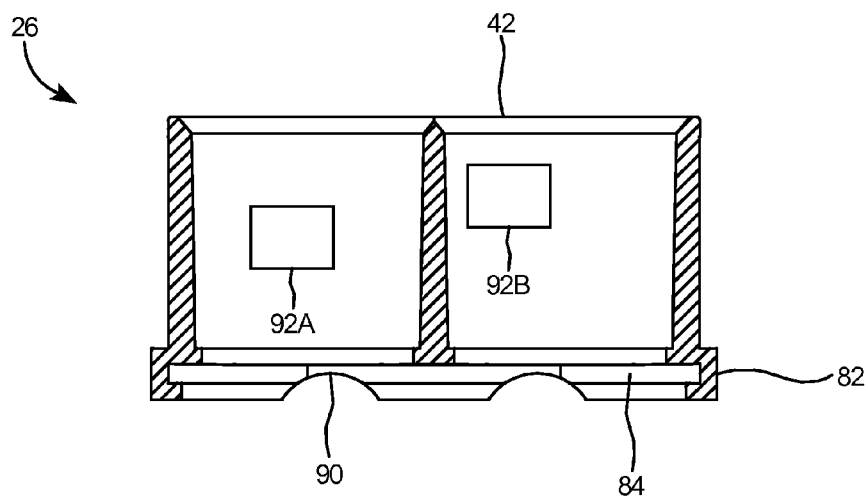
FIG. 11 is a sectional view of the rear connector body taken along line 11-11 of FIG. 10.
Figure 12:
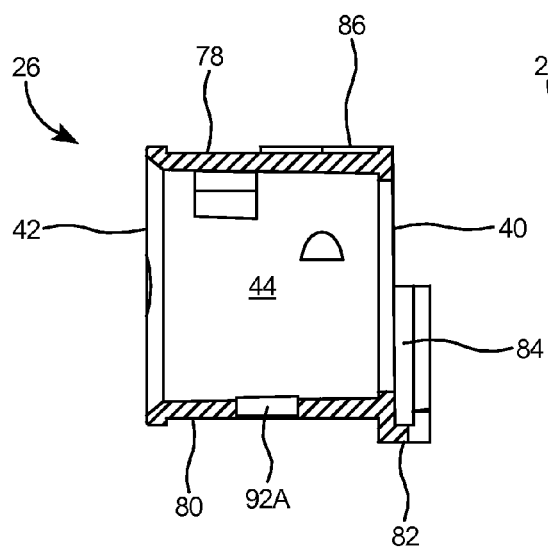
FIG. 12 is a sectional view of the rear connector body taken along line 12-12 of FIG. 10.
Figure 13:
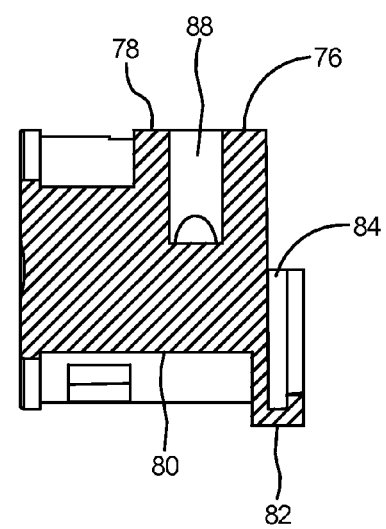
FIG. 13 is a sectional view of the rear connector body taken along line 13-13 of FIG. 10.

Referring to FIGS. 2-4, the front connector body 24 includes a top side 52, a bottom side 54, and a lip 56 extending from the top side 52 of the front connector body 24 at the trailing end 32. A tab 58 extends from the lip 56 at the top side 52 of the front connector body 24 as shown in FIG. 3 and includes an aperture 60 therein. The front connector body 24 further includes a leading flange 62 and an intermediate flange 64 surrounding the seat 36. A trailing flange 65 extends along the bottom periphery of the trailing end 32. The front connector body further includes rounded shoulders 66. Two viewports 68 are included on both the top side 52 and bottom side 54 of the front connector body 24.

With reference to FIGS. 5-7, the front connector body 24 includes a wide bore 70 at the trailing end 32 narrowing to a narrower leading bore 72. The interior walls 74 that form the transition from the wide bore 70 to the leading bore 72 are smooth, gradually arcuate, and devoid of sharp edges to enable easy passage of wire conductors from the wide bore 70 to the leading bore 72. Each viewport 68 on the top side 52 is axially aligned with a viewport on the bottom side 54 of the front connector body 24 as shown by axis 76 in FIG. 7.

Referring to FIGS. 8-10, the rear connector body 26 includes a top side 78, a bottom side 80, and a front extension 82 extending from the leading end 40. The front extension 82 extends from the lower half of the rear connector body and includes an open channel 84 therein. A boss 86 is included on the top side 78 of the rear connector body 26 and includes an aperture 88 therein. Two semi-circular notches 90 are included in the front extension 82. Openings 92A and 92B are included in the rear connector body 26, with each opening in communication with one of the trailing bores 44. As shown in FIG. 10, the front extension 82 may include outer portions 82A and an inner portion 82B separated by the semi-circular notches 90. As shown in FIGS. 14 and 15, a rim 91 extends from the outer periphery 93 of the rear connector body 26 at the leading end 40.

Figure 16:
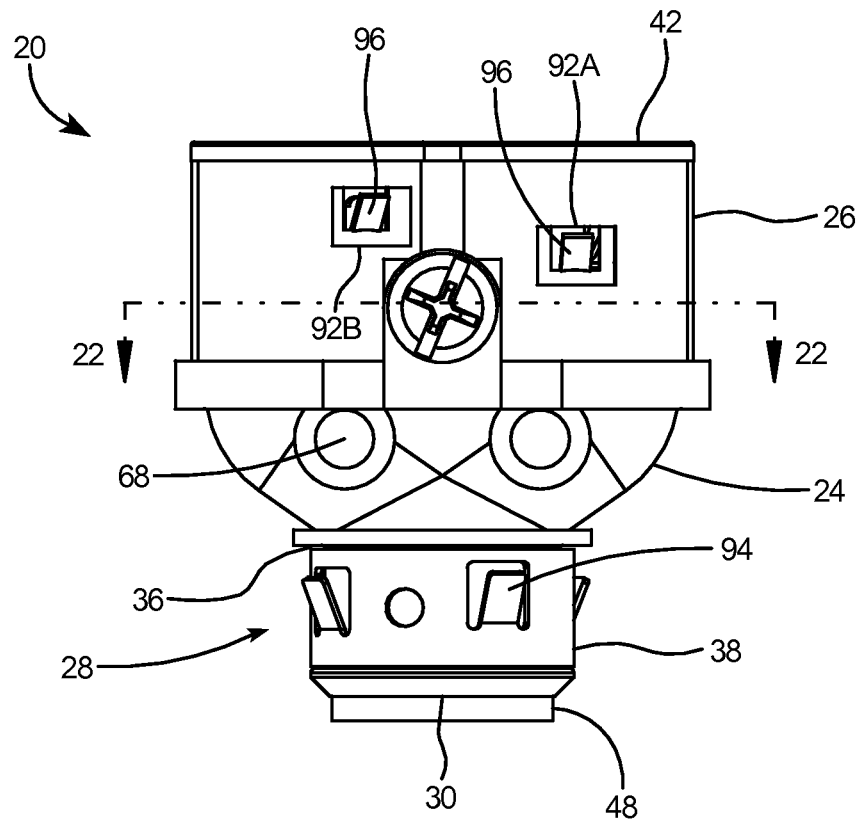
FIG. 16 is a top view of a duplex electrical connector assembly according to the present invention.
Figure 17:
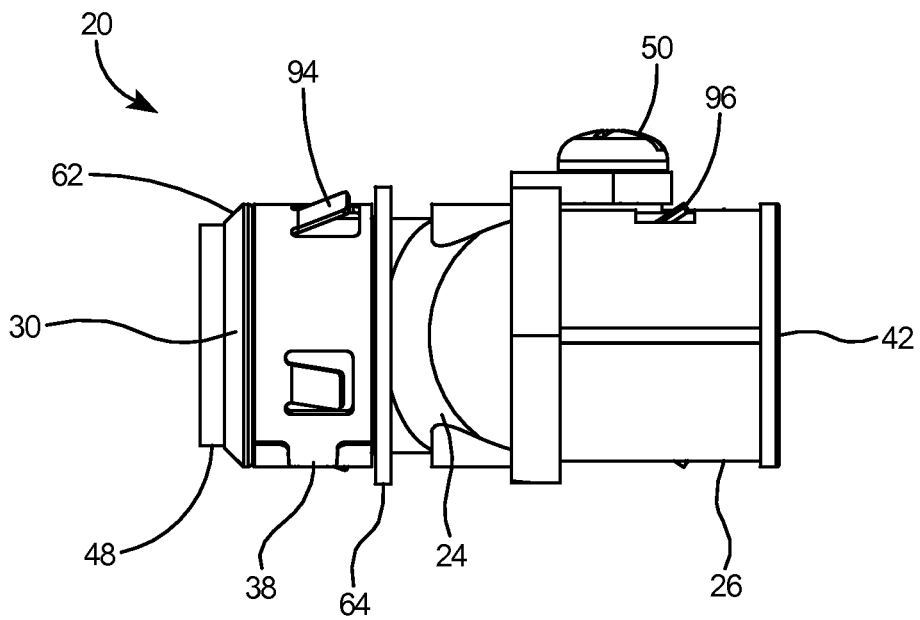
FIG. 17 is a side view of the duplex electrical connector assembly.

With reference to FIGS. 16 and 17, the duplex electrical connector 20 is assembled by securing front connector body 24 and rear connector body 26 together with fastener 50 to form a two-piece die cast connector body 22. Snap ring 38, which is preferably a split ring formed of a resilient metal and in its unbiased state includes a diameter smaller than the diameter of the seat 36, is slightly expanded to slip over the leading flange 62 and is then secured onto the seat 36 on the nose portion 28 of front connector body 24. The snap ring 38 includes locking tangs 94 thereon. The locking tangs 94 will function to secure the leading end 30 of the duplex electrical connector 20 to an electrical box or panel. Leading flange 62 and intermediate flange 64 surround the seat 36 and hold snap ring 38 in place on the connector.

A cable retaining ring 46, which is preferably a split ring formed of a resilient metal and in its unbiased state includes a diameter larger than the diameter of each of the trailing bores 44, is slightly compressed and then slipped into each of the trailing bores 44. Locking tangs 96 on the cable retaining rings 46 snap into openings 92A and 92B in rear connector body 26 and hold the cable retaining rings securely within the trailing bores 44. Throat insert 48, preferably constructed of plastic, is pressed into the leading bore 72 (see FIG. 6) of front connector body 24 and held therein by a friction fit. Throat insert 48, optional for use on the duplex electrical connector 20, acts to shield wire conductors from the interior of the leading bore in order to minimize fraying or abrasion of the outer sheath of the conductors (not shown).

Figure 18:
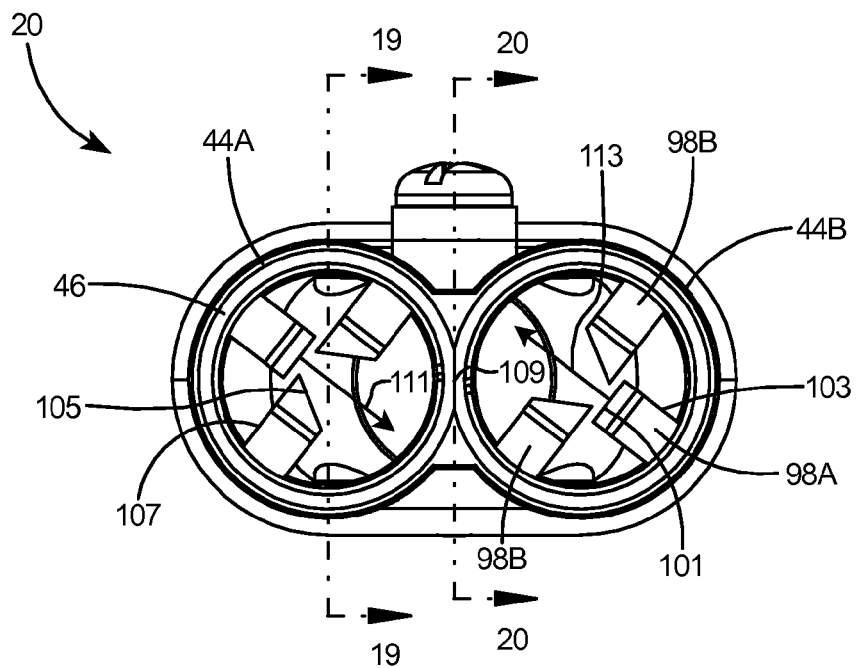
FIG. 18 is an end view of the duplex electrical connector assembly from the trailing end.
Figure 19:
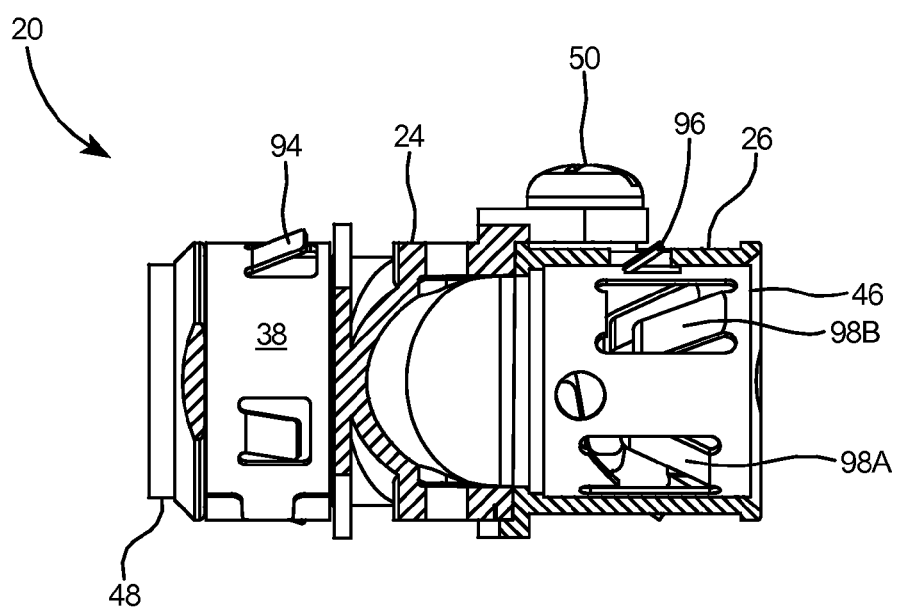
FIG. 19 is a sectional view of the duplex electrical connector assembly taken along line 19-19 of FIG. 18.

With reference to FIGS. 18 and 19, each cable retaining ring 46 includes three cable retaining tangs 98 extending inward of the cable retaining ring, including a center tang 98A and two outer tangs 98B. Center tang 98A includes a flat end 101 that is perpendicular to the sides 103 of the center tang. Outer tangs 98B include ends 105 that are angled with respect to the sides 107 of the outer tangs. The orientation of the tangs 98A and 98B with respect to the duplex connector are set by the arrangement of the openings 92A and 92B (see FIG. 14) in the rear connector body 26. Outer tangs 92B are positioned such that the short sides 107 are oriented toward the center 109 of the duplex connector and toward opposing quadrants. As shown in FIG. 18, when an electrical cable is inserted within the left trailing bore 44A, the tangs 98A and 98B in the left trailing bore push the cable toward the center of the connector and toward the right lower quadrant of the bore 44A, or in the direction of arrow 111 in FIG. 18. When an electrical cable is inserted within the right trailing bore 44B, the tangs 98A and 98B in the right trailing bore push the cable toward the center of the connector and toward left upper quadrant of the bore 44B, or in the direction of arrow 113 in FIG. 18. The orientation of the tangs 98A and 98B therefore advantageously maintain separation of the electrical cables and direct them toward the center of the leading bore (see FIG. 6).

Figure 21:
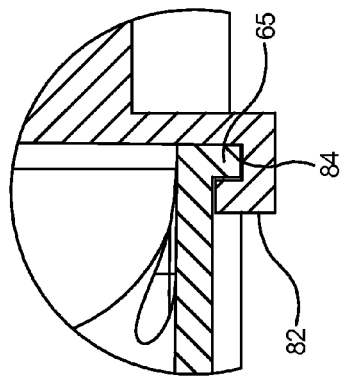
FIG. 21 is a detail view of the portion of the duplex electrical connector assembly circled in FIG. 20.
Figure 22:
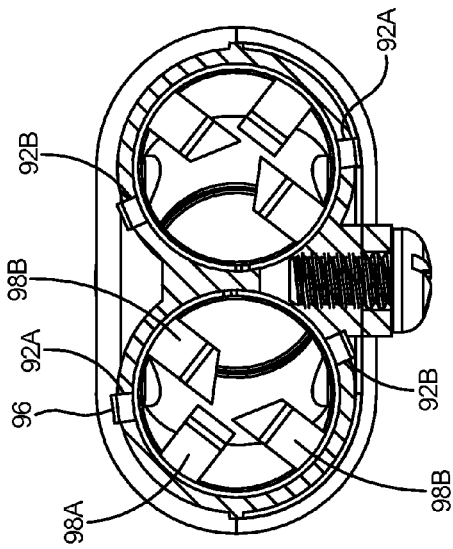
FIG. 22 is a sectional view of the duplex electrical connector assembly taken along line 22-22 of FIG. 16.
Figure 20:
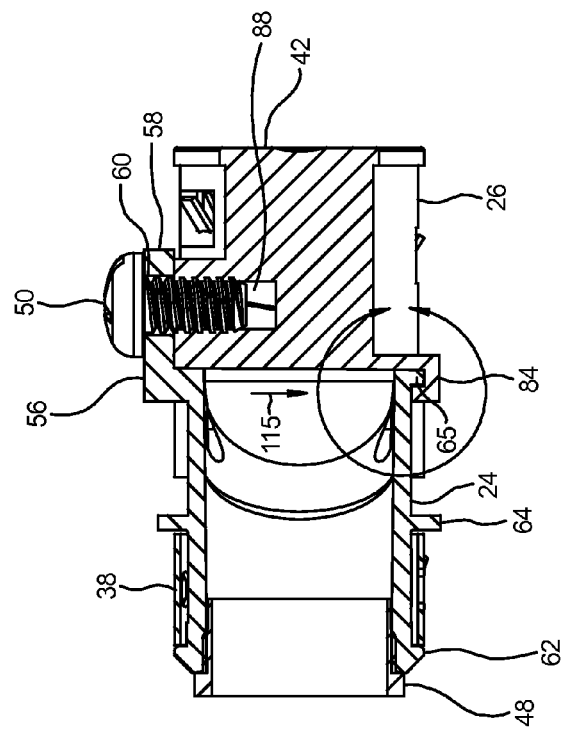
FIG. 20 is a sectional view of the duplex electrical connector assembly taken along line 20-20 of FIG. 18.

Referring to FIGS. 20-22, to secure the two connector body portions 24 and 26 together, front connector body 24 is slid sideways with respect to rear connector body 26 in the direction of arrow 115 until trailing flange 65 of front connector body latches into open channel 84 on front extension 82 of rear connector body 26. Fastener 50 is then secured through aperture 60 in tab 58 of front connector body 24 into aperture 88 in rear connector body 26.

With reference to FIGS. 23 and 24, the duplex electrical connector 20 includes a leading end 117 and a trailing end 119. The connector is used to secure one or two electrical cables (not shown) to a panel or an electrical box. To operate the invention, leading end 117 is simply pressed into the knockout of an electrical box. Locking tangs 94 on snap ring 38, being constructed of resilient metal such as spring steel, deflect inward when in contact with the walls of the knockout and then spring outward to their unbiased position after clearing the wall. The leading end is then securely locked into the knockout in the electrical box. One or two electrical cables (not shown) are then inserted into the bores 44 on the trailing end 119 of the duplex connector 20. The three cable retaining tangs 98A and 98B (see FIG. 18), then direct each electrical cable to the center of the connector and the proper quadrant, after which the electrical cables are locked securely to the duplex connector 20. The types of electrical cables and conduits that can be connector to an electrical box with the duplex electrical connector 20 include MC/HCF steel or aluminum cable, AC/HCF steel or aluminum cable, flexible metal conduit steel and aluminum, including both regular and reduced wall thickness, and MC cable continuous corrugated aluminum.

With reference to FIG. 1, the present invention provides a method for securing an electrical cable to an electrical box, the method including:
 a. providing a duplex fitting 20 including a front connector body 24 having a leading end 30, a trailing end 32 including a lip 56 and a trailing flange 65, and a tab 58 with an aperture 68 therein;
 b. providing a rear connector body 26 having a leading end 40 including a front extension 82, an open channel 84, and a rim 91, and a boss 86 with a bore 88 therein;
 c. pressing the trailing end 32 of the front connector body 24 against the leading end 40 of the rear connector body 26;
 d. sliding the trailing end 32 of the front connector body 24 along the leading end 40 of the rear connector body 26 until the trailing flange 65 of the front connector body 24 engages the open channel 84 in the rear connector body 26 and the lip 56 of the front connector body 24 engages the rim of the rear connector body 26; and
 e. threading a screw 50 through the aperture 68 in the tab 58 of said front connector body 24 and into the bore 88 of the boss 86 of the rear connector body 26.

Preferably, the front connector body 24 and rear connector body 26 are each die-cast in one-piece of zinc alloy. The snap ring 38 and cable retaining rings 46 are preferably constructed of spring steel. The throat insert 48 is preferably constructed of plastic.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A duplex electrical fitting assembly, comprising:
 a front connector body including a leading end and a trailing end with a lip, a trailing flange, and a bottom side;
 a tab with an aperture therein extending from said lip;
 a rear connector body including a leading end with a front extension, a boss with an aperture therein, two trailing bores, a plurality of cable retaining rings, said cable retaining rings inserted into the trailing bores;
 an open channel on said front extension of said rear connector body, said open channel of said rear connector body capable of accepting slide in insertion of said trailing flange of said front connector body to connect said connector bodies; and
 a fastener for insertion through said aperture of said tab of said front connector body and into said aperture of said boss of said rear connector body.

2. The duplex electrical fitting assembly of claim 1, further comprising
 a nose portion on said front connector body; and
 a seat on said nose portion.

3. The duplex electrical fitting assembly of claim 2, further comprising a snap ring on said seat of said nose portion.

4. The duplex electrical fitting assembly of claim 3, further comprising a locking tang on said snap ring.

5. The duplex electrical fitting assembly of claim 1, wherein said aperture in said boss is axially aligned at substantially a right angle to the axial alignment of said trailing bores of said rear connector body.

6. The duplex electrical fitting assembly of claim 1, further comprising
 an outer periphery on said rear connector body; and
 a rim extending outward from said outer periphery at the leading end of said rear connector body.

7. The duplex electrical fitting assembly of claim 1, further comprising a semi-circular notch in said front extension of said rear connector body.

8. The duplex electrical fitting assembly of claim 7, further comprising an outer portion and inner portion on said front extension.

9. The duplex electrical fitting assembly of claim 1, further comprising a cable retaining tang extending inward of said cable retaining ring.

10. The duplex electrical fitting of claim 9, further comprising three of said cable retaining tangs on said cable retaining ring, including a center cable retaining tang and two outer cable retaining tangs.

11. A duplex electrical fitting assembly, comprising:
 a front connector body including a leading end and a trailing end with a lip, a trailing flange, and a bottom side;
 a tab with an aperture therein extending from said lip;
 a rear connector body including a leading end with a front extension, a boss with an aperture therein, two trailing bores, a plurality of cable retaining rings, said cable retaining rings inserted into the trailing bores;
 an open channel on said front extension of said rear connector body, said open channel of said rear connector body capable of accepting slide in insertion of said trailing flange of said front connector body to connect said connector bodies; and a fastener for insertion through said aperture of said tab of said front connector body and into said aperture of said boss of said rear connector body;

an outer periphery on said rear connector body; and a rim extending outward from said outer periphery at the leading end of said rear connector body.

12. The duplex electrical fitting assembly of claim 11, further comprising a nose portion on said front connector body; and a seat on said nose portion.

13. The duplex electrical fitting assembly of claim 12, further comprising a snap ring on said seat of said nose portion.

14. The duplex electrical fitting assembly of claim 13, further comprising a locking tang on said snap ring.

15. The duplex electrical fitting assembly of claim 11, further comprising a cable retaining ring in each of said trailing bores of said rear connector body.

16. The duplex electrical fitting assembly of claim 11, wherein said aperture in said boss is axially aligned at a right angle to the axial alignment of said trailing bores of said rear connector body.

17. The duplex electrical fitting assembly of claim 11, further comprising a semi-circular notch in said front extension of said rear connector body.

18. The duplex electrical fitting assembly of claim 17, further comprising an outer portion and inner portion on said front extension.

19. A method for securing an electrical cable to an electrical box, the method including:

a. providing a duplex electrical fitting assembly including a front connector body having a leading end, a trailing end including a lip and a trailing flange, and a tab with an aperture therein;

b. providing a rear connector body having a leading end including a front extension, a trailing end, an open channel, a rim, a boss with a bore therein, two trailing bores, a plurality of cable retaining rings, said cable retaining rings inserted into the trailing bores;

c. pressing the trailing end of the front connector body against the leading end of the rear connector body;

d. sliding the trailing end of the front connector body along the leading end of the rear connector body until the trailing flange of the front connector body engages the open channel in the rear connector body and the lip of the front connector body engages the rim of the rear connector body;

e. threading a screw through the aperture in the tab of said front connector body and into the bore of the boss of the rear connector body;

f. connecting said leading end of said duplex electrical fitting assembly to the electrical box; and g. connecting the electrical cable to the trailing end of said duplex electrical fitting assembly.

* * * * *